United States Patent [19]
Hoang

[11] Patent Number: 6,167,399
[45] Date of Patent: Dec. 26, 2000

[54] JOIN INDEX FOR RELATIONAL DATABASES

[75] Inventor: Chi Kim Hoang, Palo Alto, Calif.

[73] Assignee: NCR Corporation, Dayton, Ohio

[21] Appl. No.: 09/073,113

[22] Filed: May 5, 1998

[51] Int. Cl.[7] .................................................. G06F 17/30
[52] U.S. Cl. ........................... 707/5; 707/2; 707/4; 707/6
[58] Field of Search ...................... 707/4, 2, 5, 6

[56] References Cited

U.S. PATENT DOCUMENTS

| | | | |
|---|---|---|---|
| 5,241,648 | 8/1993 | Cheng et al. ............................... | 707/7 |
| 5,666,525 | 9/1997 | Ross ............................................ | 707/2 |
| 5,870,747 | 2/1999 | Sundaresan .............................. | 707/101 |
| 5,983,215 | 11/1999 | Ross et al. ................................. | 707/2 |
| 5,987,453 | 11/1999 | Krishna et al. ............................. | 707/4 |

*Primary Examiner*—Wayne Amsbury
*Assistant Examiner*—William Trinh
*Attorney, Agent, or Firm*—Gates & Cooper

[57] ABSTRACT

The retrieval of data from a computerized database is optimized through the use of a join index. A denormalized base table is converted into a plurality of normalized tables and the join index for the normalized tables is created by combining one or more commonly-used columns of the normalized tables. Outer joins are used to generate the join index, instead of inner joins, so that the join index satisfies queries with fewer join conditions than the ones used to generate the join index. Each row of the join index comprises a fixed part and a repeated part. The fixed part is stored only once in each row, but the repeated part is comprised of recursive levels within each row, so that each row may contain as many repeated parts as needed. In addition, each of the repeated parts comprises a fixed part and a repeated part.

44 Claims, 6 Drawing Sheets

300

| OrderKey | OrderStatus | OrderDate | OrderComment | CustKey |
|---|---|---|---|---|
| 1 | Pending | 1/1/98 | ... | C1 |
| 2 | Pending | 2/1/98 | ... | C2 |
| 3 | Completed | 3/1/98 | ... | C2 |
| 4 | Completed | 4/1/98 | ... | C1 |

302

| Cust Key | Customer Name | CustomerAddress | CustomerComment |
|---|---|---|---|
| C1 | ABC Corp. | Los Angeles | ... |
| C2 | DEF Corp. | San Francisco | ... |

500

| CustomerName | OrderStatus | OrderDate | OrderStatus | OrderDate |
|---|---|---|---|---|
| ABC Corp. | Pending | 1/1/98 | Completed | 4/1/98 |
| DEF Corp. | Pending | 2/1/98 | Completed | 3/1/98 |

FIG. 2

| OrderKey | OrderStatus | OrderDate | OrderComment | CustomerName | CustomerAddress | CustomerComment |
|---|---|---|---|---|---|---|
| 1 | Pending | 1/1/98 | ... | ABC Corp. | Los Angeles | ... |
| 2 | Pending | 2/1/98 | ... | DEF Corp. | San Francisco | ... |
| 3 | Completed | 3/1/98 | ... | DEF Corp. | San Francisco | ... |
| 4 | Completed | 4/1/98 | | ABC Corp. | Los Angeles | ... |

| OrderStatus | OrderDate | CustomerName |
|---|---|---|
| Pending | 1/1/98 | ABC Corp. |
| Pending | 2/1/98 | DEF Corp. |
| Completed | 3/1/98 | DEF Corp. |
| Completed | 4/1/98 | ABC Corp. |

400

6,167,399

JOIN INDEX FOR RELATIONAL DATABASES

BACKGROUND OF THE INVENTION

1. Field of the Invention.

This invention relates in general to computerized relational databases, and in particular, to a method, apparatus and program product for performing queries against a relational database using a join index.

2. Description of Related Art.

Relational databases store information in row and column format. A collection of values which are stored in columns and rows is known as a relation. A relation contains zero or more rows and each row is comprised of one or more columns. The set of possible values for a column is referred to as a domain.

Since there can be many columns, and the domains of most columns have fewer values than the total number of rows in the relation, there is usually a fair amount of redundancy in most relations. This redundancy degrades data integrity and wastes storage space.

To minimize such redundancy, a common practice in relational database is to normalize a table, i.e., to divide a table into a number of smaller tables, each of which contains a subset of the columns of the original table. The smaller tables have at least one commonly-used column, which allows the original table to be recreated by a join operation on the smaller tables, should the need arises.

The original table is referred to as a denormalized relation and the smaller tables are referred to as normalized relations. Less total storage space is used after normalization, because unique information is stored only once in normalized relations. Moreover, normalization enhances data integrity, since there is no need to maintain redundant data.

Normalization also minimizes data redundancy, but can be expensive if join operations are used too often to recreate the original data. Thus, there is a need in the art for techniques that reduce the cost of recreating denormalized relations through join operations without increasing data redundancy.

SUMMARY OF THE INVENTION

To overcome the limitations in the prior art described above, and to overcome other limitations that will become apparent upon reading and understanding the present specification, the present invention discloses a method, apparatus and program product for optimizing the retrieval of data from a computerized database through the use of a join index. A denormalized base table is converted into a plurality of normalized tables and the join index for the normalized tables is created by combining one or more commonly-used columns of the normalized tables. Preferably, outer joins are used to generate the join index, instead of inner joins, so that the join index satisfies queries with fewer join conditions than the ones used to generate the join index. Each row of the join index comprises a fixed part and a repeated part. The fixed part is stored only once in each row, but the repeated part is comprised of recursive levels within each row, so that each row may contain as many repeated parts as needed. In addition, each of the repeated parts comprises a fixed part and a repeated part.

BRIEF DESCRIPTION OF THE DRAWINGS

Referring now to the drawings in which like reference numbers represent corresponding parts throughout:

FIG. 2 illustrates an example denormalized relation;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Enviromnent

Figure 1:
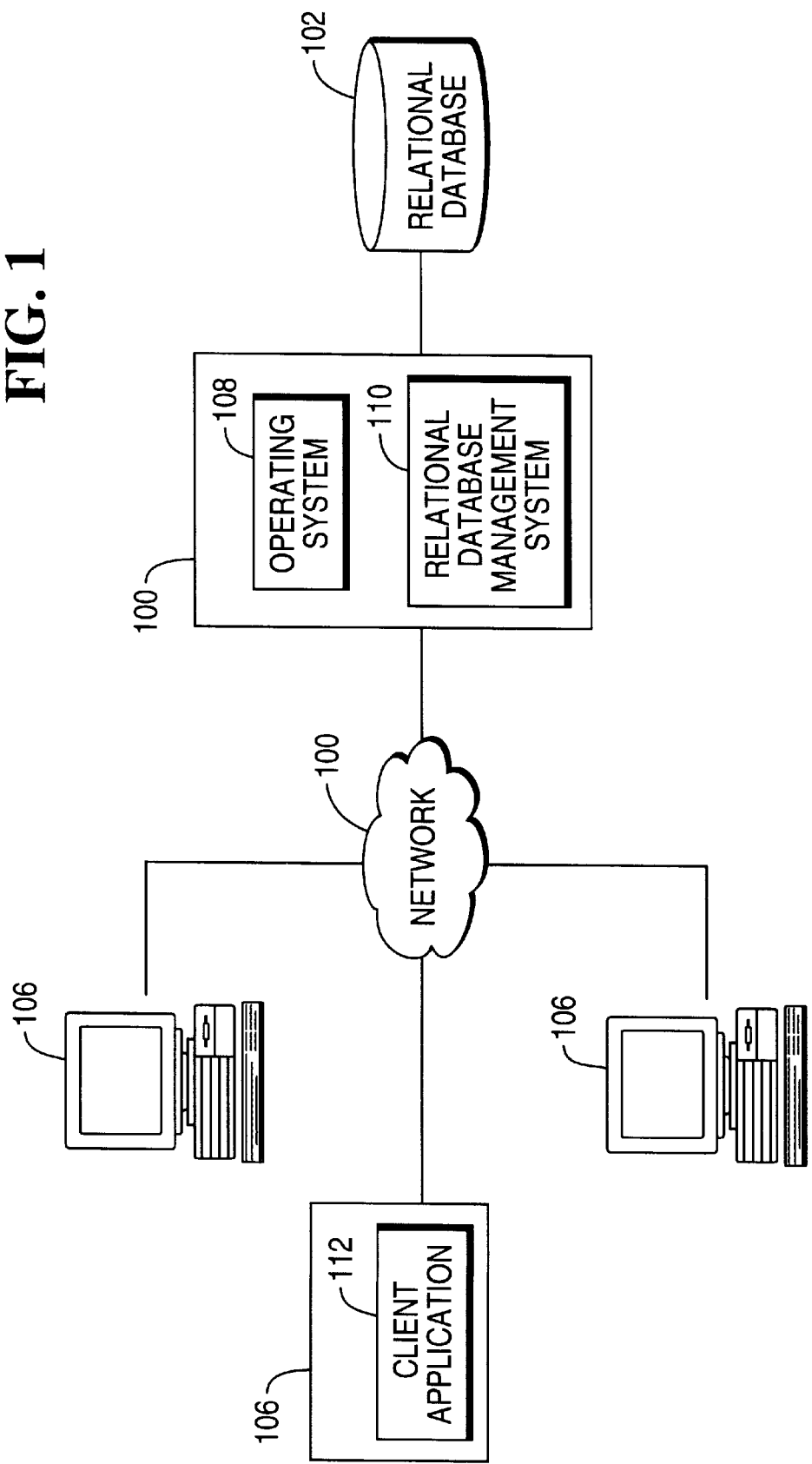
FIG. 1 is a system diagram of the components of an information retrieval system including a relational database management system (RDBMS)

FIG. 1 illustrates an exemplary hardware environment that could be used with the present invention. In the exemplary environment, the computer system 100 is typically comprised of one or more processors coupled to one or more fixed and/or removable electronic data storage units (DSUs) 102, such as disk drives, that store one or more relational databases, along with other data and programs. The computer system 100 may be connected to via a network 104 one or more client systems 106, such as workstations or personal computer, that are used by application programmers, database administrators, end users etc.

The computer system 100 operates under the control of an operating system 108 and executes a relational database management system (RDBMS) 110 that acts as an interface between the client systems 106 and a relational database stored on the DSUs 102. The present invention is typically embodied in one or more components of the RDBMS 110.

The RDBMS 110 is tangibly embodied in a computer-readable device, carrier, or medium, such as fixed or removable DSUs 102 or a remote system coupled to the computer system 100 via a data communications device. Moreover, the RDBMS 110 is comprised of instructions which, when executed by the computer system 100, cause the computer system 100 to perform the steps necessary to implement the steps and elements of the present invention described below.

Operators of the client systems 106 interact with a client application 106 that causes the client systems 106 to transmit electrical signals to and from the computer system 100 that represent commands for performing various search and retrieval functions, termed queries, and various data update functions. The RDBMS 110 then performs the desired data access using the relational database, and data retrieved from the relational database is returned to the client systems 106 in response to the queries.

In the preferred embodiment of the present invention, the queries conform to the Structured Query Language (SQL) standard and the RDBMS 110 comprises the Teradatag® product offered by NCR Corporation, the assignee of the resent invention. Those skilled in the art will recognize, however, that the present invention has application to any RDBMS 110 that permits normalization and performs join operations to accomplish denormalization. The RDBMS 110 performs the functions necessary to implement the RDBMS functions and SQL standards, i.e., definition, compilation, interpretation, optimization, database access control, database retrieval, and database update.

Select Statement

One of the most common SQL queries executed by the RDBMS 110 is the SELECT statement. In the SQL standard, the SELECT statement generally comprises the format: "SELECT<clause>FROM<clause>WHERE<clause>GROUP BY <clause>HAVING<clause>ORDER BY<clause>." The clauses generally must follow this sequence, but only the SELECT and FROM clauses are required. The result of a SELECT statement is a subset of data retrieved by the RDBMS 110 from one or more existing tables stored in the relational database, wherein the FROM clause identifies the name of the table from which data is being selected. The subset of data is treated as a new table, termed the result table, which typically comprises a temporary table. In general, the items specified in the SELECT clause determine the columns that will be returned in the result table from the table(s) identified in the FROM clause.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

Join Operation

A join operation is usually implied by naming more than one table in the FROM clause of a SELECT statement. A join operation makes it possible to combine tables by combining rows from one table to another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Join operations can be used to recreate denormalized tables from normalized tables, as described in more detail below. However, the use of such join operations can cause serious performance issues for the RDBMS 110.

Denormalized Tables

FIG. 2 illustrates an example denormalized table or relation 200, named OrderCustomer, that contains information about customer orders. OrderCustomer 200 includes the following columns: OrderKey, OrderStatus, OrderDate, OrderComment, CustomerName, CustomerAddress, CustomerComment. The columns OrderKey, OrderStatus and OrderDate describe orders, and the columns CustomerName, CustomerAddress and CustomerComment contain information about customers who placed the orders.

More than one row may exist in OrderCustomer 200 for the same customer, and each such row would contain redundant information for CustomerName, CustomerAddress and CustomerComment. Of course, this redundant information wastes storage space. Moreover, when a customer with multiple rows changes its address, all rows in the OrderCustomer 200 for the customer must be updated with the new address in CustomerAddress; otherwise, an inconsistency results.

Normalized Tables

Figure 3:
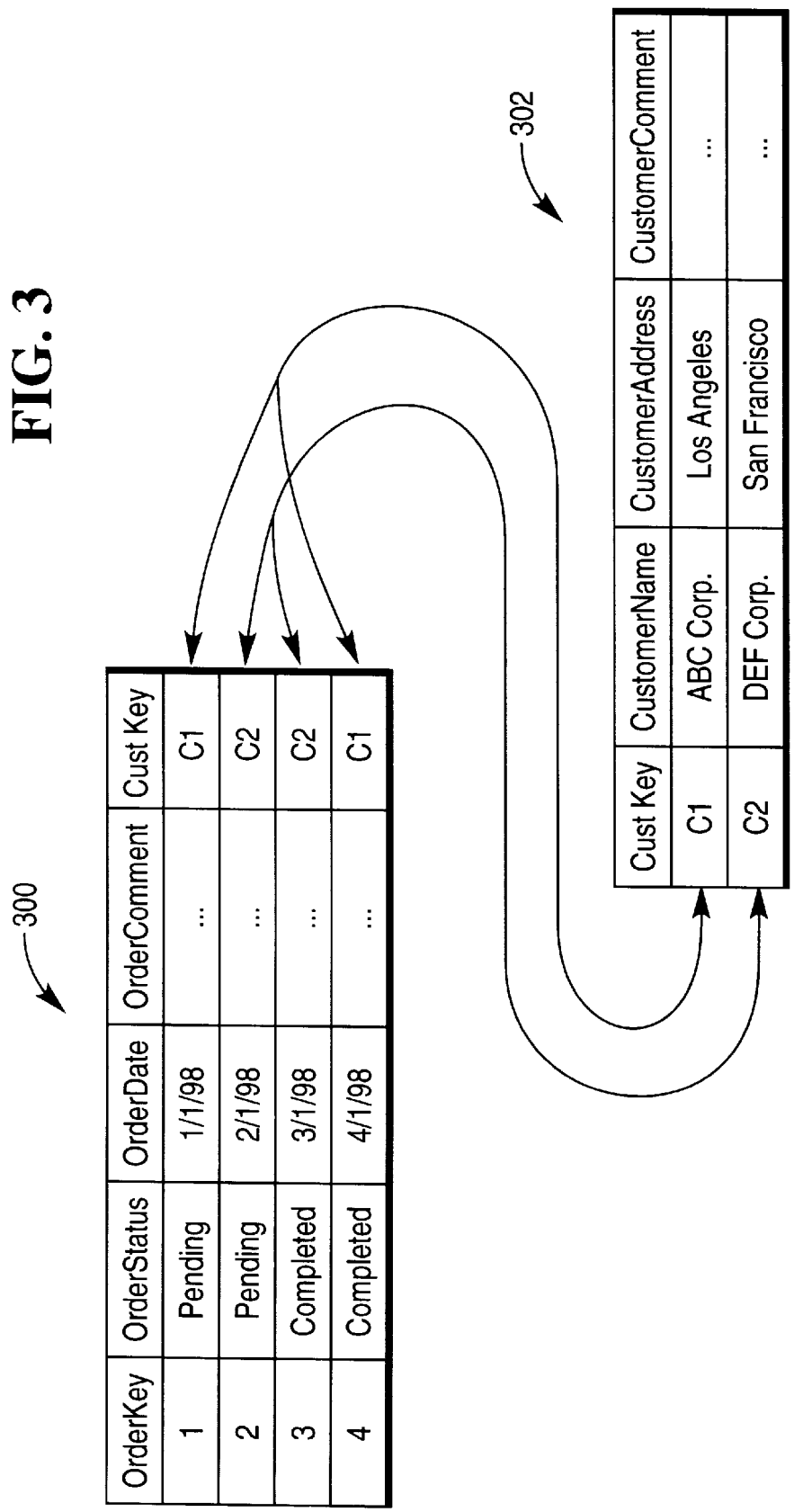
FIG. 3 illustrates how a denormalized relation may be normalized.

FIG. 3 illustrates how the OrderCustomer 200 may be broken up into two normalized tables or relations 300 and 302, named Order and Customer, to avoid storing information redundantly. Order 300 includes the columns OrderKey, OrderStatus, and OrderDate from the OrderCustomer 200, as well as a new column CustKey that is used to relate Order 300 to Customer 302. Customer 302 includes the columns CustomerName, CustomerAddress, CustomerComment from the OrderCustomer 200, as well as a new column CustKey that is used to relate Customer 302 to Order 300. Each customer is assigned a unique CustKey value in Customer 302.

After normalization, each customer's order is represented by a row in Order 300 having a CustKey value that is used to retrieve the information from Customer 302. The relationship between Order 300 and Customer 302 is a parent-child relationship with Customer 302 being the parent and Order 300 being the child. A child table is said to reference a parent table via a foreign key, which in this example is the CustKey field. The CustKey field in Order 300 is a foreign key and the CustKey field in Customer 302 is a primary key.

The relationship between two related normalized tables can be strictly enforced by defining a referential constraint. If there is no referential constraint defined, a row in a child table may exist without a related row in the parent table. A referential constraint prevents a row from being added to the child table unless there already exists a corresponding row in the parent table whose primary key value is the same as the foreign key value for the row being added in the child table. Referential constraints guarantee that no orphans exist in the child relation. However, maintaining these constraints imposes a cost.

The following query can be used to reconstruct the information originally contained in the denormalized OrderCustomer 200 from the normalized Order 300 and Customer 302:

Select OrderKey, OrderStatus, OrderDate, CustomerName, CustomerAddress, CustomerComment From Order, Customer Where Order.CustKey=Customer.CustKey.

In performing the above query, the RDBMS 110 performs a join operation to match rows from Order 300 and Customer 302 using values of CustKey, wherein the join operation returns all pairs of matching rows. Normalization of tables minimizes data redundancy, but it can be expensive if join operations are used too often to recreate the original data.

Join Index

Figures 4, 6:
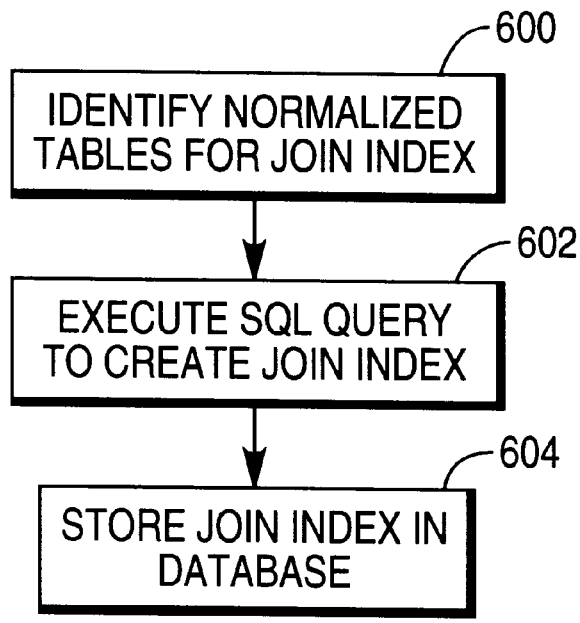
FIG. 4 illustrates the structure of a Join Index.
FIG. 6 is a flowchart illustrating the steps necessary for the creation of the Join Index according to the present invention.

FIG. 4 illustrates a Join Index 400, which is created by joining certain columns of the normalized relations, Order 300 and Customer 302, that can be used by the RDBMS 110 to reduce the cost of recreating the denormalized relation, OrderCustomer 200, through the use of join operations. The difference between the Join Index 400 and OrderCustomer 200 is that the Join Index 400 contains only commonly-used columns from Customer 302 and Order 300.

In the example of FIG. 4, the Join Index 400 is comprised of the following columns: OrderStatus, OrderDate, CustomerName. Thus, whenever a request is made for only data found in OrderStatus, OrderDate, and/or CustomerName, the data can be retrieved from the Join Index 400 rather than the two normalized tables Order 300 and Customer 302.

The Join Index 400 of FIG. 4 can be created using the result of the following query:

Select OrderStatus, OrderDate, CustomerName

From Order, Customer

Where Order.CustKey=Customer.CustKey.

A Join Index 400 has its disadvantages, however. One disadvantage is that, in order to use the Join Index 400, a query must specify a join condition which is the same as or a superset of the join condition used to create the Join Index 400 (e.g., Order.CustKey=Customer.CustKey in the above example). That is, since the above query does not return orphaned rows from Order 300, the Join Index 400 does not have information for orders with missing customers.

The information in a Join Index 400 is only as complete, i.e., identically the same, as information in the relations that created the Join Index 400 when there is a referential constraint defined for the columns specified in the Join Index 400. In the above example, the OrderStatus and OrderDate columns in the Join Index 400 are only complete if the CustKey column is used in the definition of a referential constraint on CustKey between Order 300 and Customer 302.

If there is a referential constraint between Order.CustKey and Customer.CustKey, where Order.CustKey is a foreign key that references the primary key Customer.CustKey (i.e., for each row in Order 300 with some value in CustKey, there is a row in Customer 302 with the same value in CustKey), then the Join Index 400 can be used to satisfy a request to retrieve OrderStatus or OrderDate data from Order 300.

Nonetheless, there are disadvantages to such a use of the Join Index 400. For example, the Join Index 400 cannot be used to satisfy a request to retrieve CustomerName from Customer 302 because Order.CustKey is not a primary key with an associated foreign key of Customer.CustKey, and therefore there is no guarantee that each Customer 302 has some associated rows in Order 300. As a result, there is no guarantee that all Customer 302 rows exist in the Join Index 400.

Another disadvantage is the cost to maintain the referential constraint, which could be quite high. For example, for each row insertion into Order 300, the RDBMS 110 must check whether there is a corresponding value in Customer 302. In addition, or each deletion or update in Customer 302 that changes CustKey, the RDBMS 110 must verify that no rows in Order 300 refer to the deleted CustKey value. In some cases, the needed referential constraint may not be available.

Yet another disadvantage is that using the Join Index 400 re-introduces some of the redundancy of denormalized relations. This redundancy wastes storage space.

Figure 5:
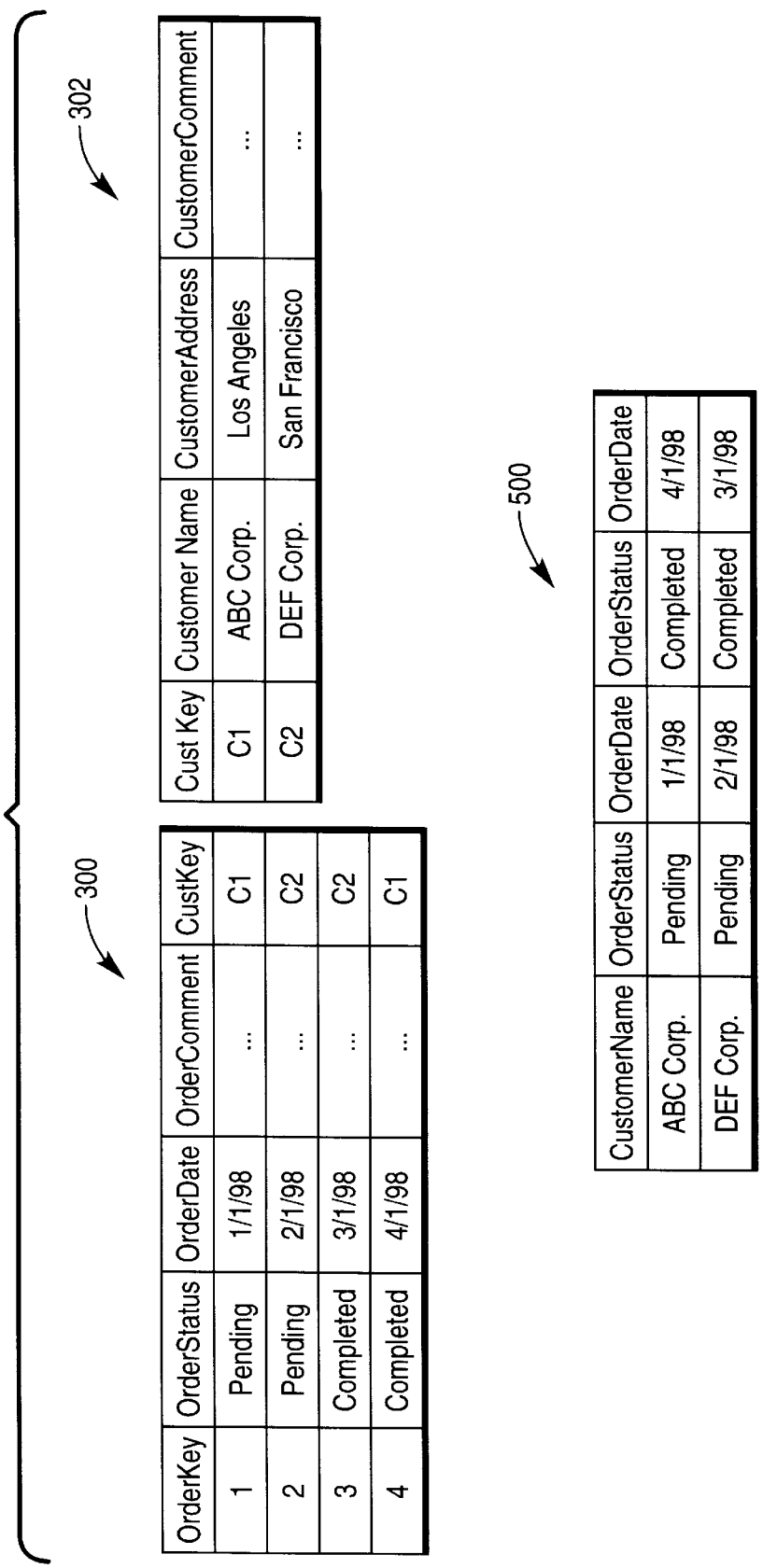
FIG. 5 illustrates the structure of a Join Index and its normalized relations.

FIG. 5 illustrates a Join Index 500 having a novel structure, which overcomes the disadvantages of the Join Index 400. To avoid redundant information in the Join Index 500, each row of a Join Index 500 contains two parts: a fixed part and a repeated part. The fixed part is stored only once, but the repeated part is comprised of recursive levels, so that it may contain as many values as needed. Each of the repeated parts may themselves contain two parts: a fixed and a repeated part.

For example, a row in the Join Index 500 with no recursive level is defined as:

F1 [R11 R12, R13, . . . ]

where Fx indicates the fixed portion and Rxx indicates the repeat portion.

Similarly, a row in the Join Index 500 with one recursive level is defined as:

F1[{F12,(R121, R122, . . . )}, {F13,(R131,RI32,R133, . . . )}, . . ]

where Fx and Fxx indicate the fixed portions and Rxxx indicates the repeat portion.

In this novel structure, all rows resulting from the join operation that creates the Join Index 500 having the same outermost fixed part are collapsed and stored into one row in the Join Index 500, wherein a repeated field is added for each joined row.

In the example of FIG. 5, there are two rows in Order 300 for each of the two rows in Customer 200, which results in the indicated rows of the Join Index 500. Note that even though a total of four rows exist in Order 300, only two rows exist in the Join Index 500 (Customer+Order) and the information about each customer is stored only once. The effect of this structure is that the Join Index 500 can perform like a denormalized table (no join operations are needed) but the space required is equivalent to that of normalized table.

The Join Index 500 may perform even better than a denormalized table in case where a request to retrieve data specifies a constraint on the customer information, as shown in the following example query:

Select *

From Customer, Order

Where Customer.CustKey=Order.CustKey and CustomerName="Customer1";

In this example, the number of times the constraint needs to be evaluated using the Join Index 500 is identical to the number of rows in Customer 302. Conversely, the number of times the constraint needs to be evaluated using a denormalized table is identical to the number of rows in the larger table (which, in the example of FIG. 5, would be equal to the number of rows in Order 300).

The cost to evaluate the condition can be determined as indicated below:

N1: cardinality in Customer

N2: cardinality in Order

C: cost to evaluate the condition CustomerName= "Customer1"

where N1<<N2 (i.e., each Customer has several Orders)

Since Customer.CustomerName is stored only N1 times within the Join Index 500, the cost to evaluate the condition is N1*C. On the other hand, since Customer. CustomerName is stored N2 times (in N2 CustomerOrder rows) in the denormalized table, the cost to evaluate the condition is N2*C. Therefore, if N1<<N2,then N1*C<<N2*C.

The present invention also discloses a novel method for creating the Join Index 500. Preferably, outer joins are used to generate the Join Index 500, instead of inner joins, so that the Join Index 500 satisfies queries with fewer join conditions than the ones used to generate the Join Index 500.

For example, if the Join Index 500 is defined as above:

Create Join Index J1 On

Select OrderStatus, OrderDate, CustomerName

From Order, Customer

Where Order.CustKey=Customer.CustKey

If some rows in Order 300 do not yet have the information about the Customer (CustKey=Null), then the Join Index 500 will not contain information about these rows, because the inner join will not retain these rows from Order 300. As a result, queries that request retrieval of information about rows in Order 300 alone cannot use the Join Index 500 because some of the rows may be missing.

On the other hand, the present invention constructs the Join Index 500 using an outer join, as in the following example query:

Create Join Index J1 On

Select OrderStatus, OrderDate, CustomerName

From Order Left Join Customer

On Order.CustKey=Customer.CustKey;

Those skilled in the art will recognize that the order of the tables and the type of join operations may be altered from this example without departing from the scope of the present invention.

In this example, all rows from Order 300 are retained in the Join Index 500 regardless of whether they have a matching row in Customer 302 or not. As a result, the Join Index 500 can be used for queries that request the retrieval of data from Order 300 alone, as shown in the following example query:

Select OrderStatus, OrderDate

From Order

The use of the Join Index 500 in this example is more advantageous than the use of Order 300, if the Join Index 500 is smaller than Order 300. That is possible if the Join Index 500 either contains less fields or smaller fields than Order 300.

Logic Of The Relational Database Management System

Figure 7:
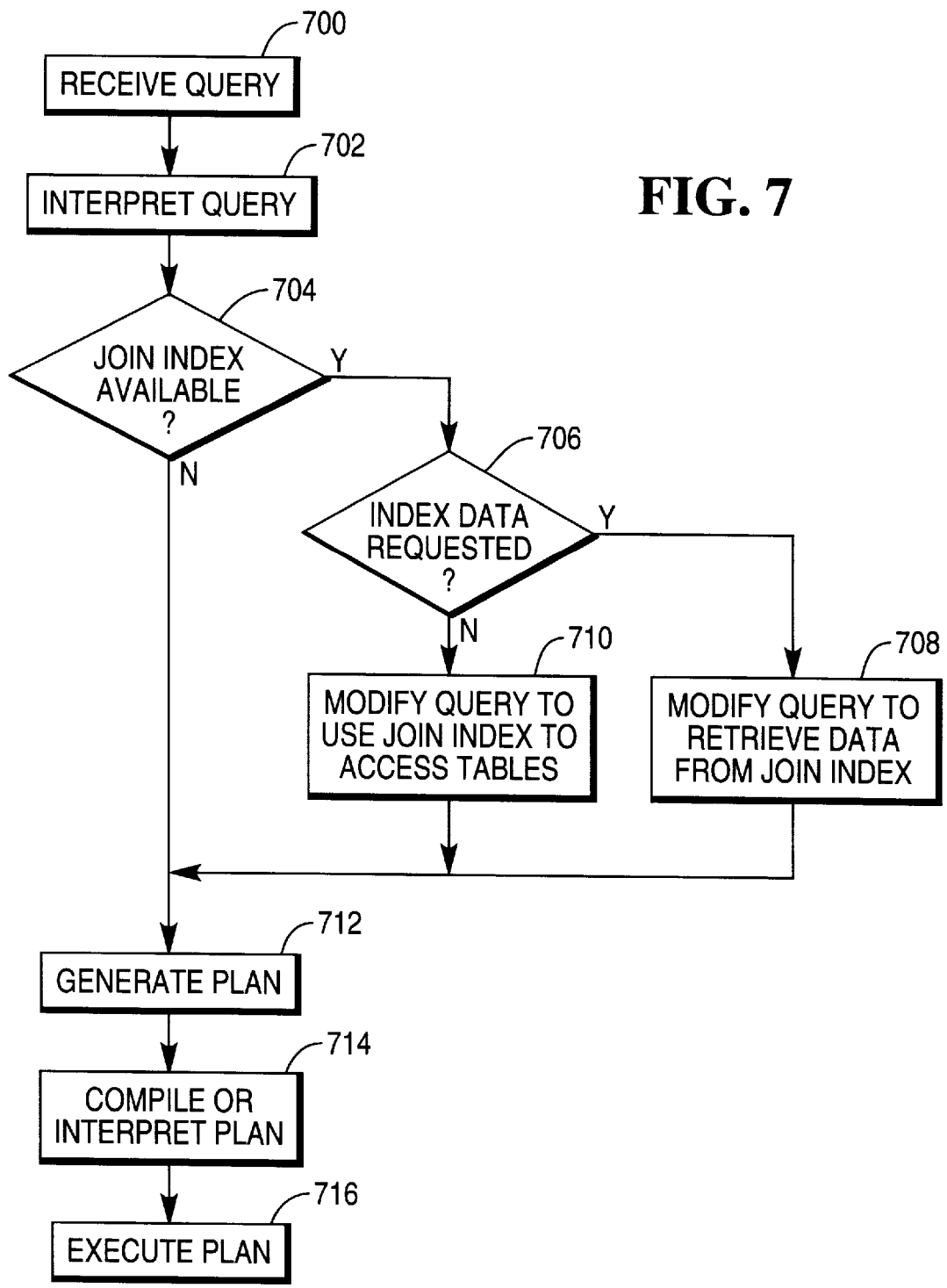
FIG. 7 is a flowchart illustrating the steps necessary for the use of the Join Index by the relational database management system according to the present invention.

Flowcharts which illustrate the logic of the RDBMS 110 using a Join Index 500 according to the present invention are shown in FIGS. 6 and 7. Those skilled in the art will recognize that this logic is provided for illustrative purposes only and that different logic may be used to accomplish the same results.

Creating The Join Index

FIG. 6 is a flowchart illustrating the steps performed by the RDBMS 110 to create a Join Index 500 according to the present invention.

Block 600 represents the RDBMS 110 identifying the normalized tables from which to create the Join Index 500.

Block 602 represents the RDBMS 110 performing an SQL query to create the Join Index 500, wherein the query comprises, for example, the following:

Create<Join Index>On

Select<Commonly-Used Columns C1, C2, . . . >

From<Normalized Table#1>Left Join<Normalized Table#2>

Where<Foreign Key>=<Primary Key>

Those skilled in the art will recognize that the other tables and other joins may be substituted for those indicated above.

Finally, Block 604 represents the RDBMS 110 storing the resulting Join Index 500 for later use.

Accessing Data Using The Join Index

FIG. 7 is a flowchart illustrating the steps performed by the RDBMS 110 to use a Join Index 500 for accessing data according to the present invention.

Block 700 represents the RDBMS 110 receiving an SQL query comprising, for example, a query against one or more normalized tables in the relational database.

Block 702 represents the RDBMS 110 interpreting the SQL query.

Block 704 is a decision block that represents the RDBMS 110 determining whether a Join Index 500 exists for the normalized tables referenced by the query. If not, control transfers to Block 712, which represents the RDBMS 110 performing standard processing for the SQL query; otherwise, control transfers to Block 706.

Block 706 is a decision block that represents the RDBMS 110 determining whether the SQL query requests only data that can be found in the commonly-used columns of the Join Index 500. If so, control transfers to Block 708, which represents the RDBMS 110 modifying the query to retrieve data only from the Join Index 500 rather than the normalized tables; otherwise, control transfers to Block 710; otherwise, control transfers to Block 710, which represents the RDBMS 110 modifying the query to retrieve data from the normalized tables using the Join Index 500.

Block 712 represents the RDBMS 110 generating a plan that enables the RDBMS 110 to retrieve the correct information from the relational database.

Block 714 represents the RDBMS 110 compiling the plan into object code for more efficient execution by the RDBMS 110, although it could be interpreted rather than compiled.

Finally, Block 716 represents the RDBMS 110 executing the plan, retrieving the result from the relational database, and then returning the result to the client application 112.

Conclusion

This concludes the description of the preferred embodiment of the invention. The following paragraph describes an alternative embodiment for accomplishing the same invention.

In one alternative embodiment, any type of computer, such as a mainframe, minicomputer, or personal computer, could be used to implement the present invention. In addition, any software program adhering (either partially or entirely) to the SQL language could benefit from the present invention. Finally, any database management system that performs join operations on normalized tables could benefit from the present invention.

In summary, the present invention discloses a method, apparatus, and program product for optimizing the retrieval of data from a computerized database through the use of a join index. A denormalized base table is converted into a plurality of normalized tables and the join index for the normalized tables is created by combining one or more commonly-used columns of the normalized tables. Each row of the join index comprises a fixed part and a repeated part. The fixed part is stored only once in each row, but the repeated part is comprised of recursive levels within each row, so that each row may contain as many repeated parts as needed. In addition, each of the repeated parts comprises a fixed part and a repeated part.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing retrieval of data from a computerized database, comprising:
   (a) converting a denormalized base table containing the data into a plurality of normalized tables; and
   (b) creating a join index for the normalized tables by combining one or more commonly-used columns of the normalized tables, wherein each row of the join index contains a fixed part and at least one repeated part, and each of the repeated parts contains a fixed part and a repeated part.

2. The method of claim 1 above, wherein the fixed part is stored only once in each row, but the repeated part is comprised of recursive levels within each row, so that each row may contain as many repeated parts as needed.

3. The method of claim 1 above, further comprising accessing the data using the join index in response to a query.

4. The method of claim 1 above, further comprising creating the join index by performing a join operation on the normalized tables.

5. The method of claim 4 above, further comprising creating the join index using one or more outer join operations instead of inner join operations.

6. The method of claim 5 above, wherein all rows from a first normalized table are retained in the join index regardless of whether the rows have a matching row in a second normalized table.

7. The method of claim 5 above, further comprising creating the join index using one or more full outer join operations.

8. The method of claim 7 above, wherein the join index retains data from all rows from the normalized tables.

9. The method of claim 1 above, further comprising specifying a referential constraint for one or more of the commonly-used columns between the normalized tables.

10. The method of claim 9 above, wherein the referential constraint relates to a foreign key of a first one of the normalized tables that references a primary key of a second one of the second normalized tables.

11. The method of claim 3 above, further comprising satisfying the query with data from the commonly-used columns of the join index rather than the normalized tables.

12. The method of claim 11 above, further comprising satisfying a query for data from the join index when the query specifies a join condition that is identical to the join operation used to create the join index.

13. The method of claim 11 above, further comprising satisfying the query with data from the join index when the query specifies a join condition that is a superset of the join operation used to create the join index.

14. The method of claim 11 above, further comprising satisfying a query with data from the join index when the query specifies a join condition that has fewer join conditions than the join operation used to create the join index.

15. An apparatus for optimizing retrieval of data from a computerized database, comprising:
   (a) a computer having one or more electronic storage devices connected thereto, wherein the data is stored on one or more of the electronic storage devices;
   (b) means, performed by the computer, for converting a denormalized base table containing the data into a plurality of normalized tables; and
   (c) means, performed by the computer, for creating a join index for the normalized tables by combining one or more commonly-used columns of the normalized tables, wherein each row of the join index contains a fixed part and at least one repeated part, and each of the repeated parts contains a fixed part and a repeated part.

16. The apparatus of claim 15 above, wherein the fixed part is stored only once in each row, but the repeated part is comprised of recursive levels within each row, so that each row may contain as many repeated parts as needed.

17. The apparatus of claim 15 above, further comprising means for creating the join index by performing a join operation on the normalized tables.

18. The apparatus of claim 17 above, further comprising means for creating the join index using one or more outer join operations instead of inner join operations.

19. The apparatus of claim 18 above, wherein all rows from a first normalized table are retained in the join index regardless of whether the rows have a matching row in a second normalized table.

20. The apparatus of claim 18 above, further comprising means for creating the join index using one or more full outer join operations.

21. The apparatus of claim 20 above, wherein the join index retains data from all rows from the normalized tables.

22. The apparatus of claim 15 above, further comprising means for specifying a referential constraint for one or more of the commonly-used columns between the normalized tables.

23. The apparatus of claim 22 above, wherein the referential constraint relates to a foreign key of a first one of the normalized tables that references a primary key of a second one of the second normalized tables.

24. The apparatus of claim 15 above, further comprising means for accessing the data using the join index in response to a query.

25. The apparatus of claim 24 above, further comprising means for satisfying the query with data from the commonly-used columns of the join index rather than the normalized tables.

26. The apparatus of claim 25 above, further comprising means for satisfying a query for data from the join index when the query specifies a join condition that is identical to the join operation used to create the join index.

27. The apparatus of claim 25 above, further comprising means for satisfying the query with data from the join index when the query specifies a join condition that is a superset of the join operation used to create the join index.

28. The apparatus of claim 25 above, further comprising means for satisfying a query with data from the join index when the query specifies a join condition that has fewer join conditions than the join operation used to create the join index.

29. A data structure stored in a memory for use by a computer program executed by a computer, the data structure comprising a join index for a plurality of normalized tables, wherein each row of the join index comprises a fixed part and a repeated part.

30. The data structure of claim 29 above, wherein the fixed part is stored only once in each row, but the repeated part is comprised of recursive levels within each row, so that each row may contain as many repeated parts as needed.

31. A program storage device, readable by a computer, tangibly embodying one or more instructions executable by the computer to perform method steps for optimizing retrieval of data from a computerized database, the method comprising:

(a) converting a denormalized base table containing the data into a plurality of normalized tables; and (b) creating a join index for the normalized tables by combining one or more commonly-used columns of the normalized tables, wherein each row of the join index contains a fixed part and at least one repeated part, and each of the repeated parts contains a fixed part and a repeated part.

32. The program storage device of claim 31 above, wherein the fixed part is stored only once in each row, but the repeated part is comprised of recursive levels within each row, so that each row may contain as many repeated parts as needed.

33. The program storage device of claim 31 above, further comprising creating the join index by performing a join operation on the normalized tables.

34. The program storage device of claim 33 above, further comprising creating the join index using one or more outer join operations instead of inner join operations.

35. The program storage device of claim 34 above, wherein all rows from a first normalized table are retained in the join index regardless of whether the rows have a matching row in a second normalized table.

36. The program storage device of claim 34 above, further comprising creating the join index using one or more full outer join operations.

37. The program storage device of claim 36 above, wherein the join index retains data from all rows from the normalized tables.

38. The program storage device of claim 31 above, further comprising specifying a referential constraint for one or more of the commonly-used columns between the normalized tables.

39. The program storage device of claim 38 above, wherein the referential constraint relates to a foreign key of a first one of the normalized tables that references a primary key of a second one of the second normalized tables.

40. The program storage device of claim 31 above, further comprising accessing the data using the join index in response to a query.

41. The program storage device of claim 40 above, further comprising satisfying the query with data from the commonly-used columns of the join index rather than the normalized tables.

42. The program storage device of claim 41 above, further comprising satisfying a query for data from the join index when the query specifies a join condition that is identical to the join operation used to create the join index.

43. The program storage device of claim 41 above, further comprising satisfying the query with data from the join index when the query specifies a join condition that is a superset of the join operation used to create the join index.

44. The program storage device of claim 41 above, further comprising satisfying a query with data from the join index when the query specifies a join condition that has fewer join conditions than the join operation used to create the join index.

* * * * *

UNITED STATES PATENT AND TRADEMARK OFFICE
CERTIFICATE OF CORRECTION

PATENT NO. : 6,167,399
DATED : December 26, 2000
INVENTOR(S) : Hoang, C. K.

It is certified that error appears in the above-identified patent and that said Letters Patent is hereby corrected as shown below:

Title page
Page 1, (54) delete "JOIN INDEX FOR RELATIONAL DATABASES" and substitute -- A JOIN INDEX HAVING FIXED AND REPEATED ELEMENTS ADDITIONALLY HAVING FIXED AND REPEATED ELEMENTS WITHIN THE REPEATED ELEMENTS FOR OPTIMIZING DATA RETRIEVAL -- .

Column 10,
Line 58, delete "a repeated part." and substitute -- at least one repeated part, and each of the repeated parts contains a fixed part and a repeated part. --

Signed and Sealed this

Twenty-eighth Day of August, 2001

*Attest:*

NICHOLAS P. GODICI
*Attesting Officer*  *Acting Director of the United States Patent and Trademark Office*